(12) United States Patent
Marcu

(10) Patent No.: US 7,689,405 B2
(45) Date of Patent: Mar. 30, 2010

(54) STATISTICAL METHOD FOR BUILDING A TRANSLATION MEMORY

(75) Inventor: Daniel Marcu, Hermosa Beach, CA (US)

(73) Assignee: Language Weaver, Inc., Los Angeles, CA (US)

( * ) Notice: Subject to any disclaimer, the term of this patent is extended or adjusted under 35 U.S.C. 154(b) by 1433 days.

(21) Appl. No.: 10/150,532

(22) Filed: May 17, 2002

(65) Prior Publication Data

US 2003/0009322 A1 Jan. 9, 2003

Related U.S. Application Data

(60) Provisional application No. 60/291,852, filed on May 17, 2001.

(51) Int. Cl.
*G06F 17/28* (2006.01)
(52) U.S. Cl. .................. 704/2; 704/4; 704/5; 704/7; 704/8; 715/264
(58) Field of Classification Search .............. 704/2–8, 704/277, 9; 715/264
See application file for complete search history.

(56) References Cited

U.S. PATENT DOCUMENTS

| | | | | |
|---|---|---|---|---|
| 5,477,451 A | * | 12/1995 | Brown et al. | 704/9 |
| 5,724,593 A | * | 3/1998 | Hargrave et al. | 704/7 |
| 6,131,082 A | * | 10/2000 | Hargrave et al. | 704/7 |
| 6,236,958 B1 | | 5/2001 | Lange et al. | |
| 6,278,969 B1 | * | 8/2001 | King et al. | 704/7 |
| 6,304,841 B1 | * | 10/2001 | Berger et al. | 704/2 |
| 6,393,388 B1 | | 5/2002 | Franz et al. | |
| 6,393,389 B1 | | 5/2002 | Chanod et al. | |
| 6,415,250 B1 | | 7/2002 | van den Akker | |
| 6,473,729 B1 | * | 10/2002 | Gastaldo et al. | 704/4 |
| 7,107,204 B1 | * | 9/2006 | Liu et al. | 704/2 |

OTHER PUBLICATIONS

Vogel et al., Construction of a Hierarchical Translation Memory, 2000, ACL, pp. 1131-1135.*
Och et al., Improved Alignment Models for Statistical Machine Translation, 1999, ACL p. 20-28.*
Brown, Example-Based Machine Translation in the Pangloss system, International Conference on Computational Linguistics, Proceedings of the 16th conference on Computational Linguistics, vol. 1, pp. 169-174.*
Brown et al., The Mathematics of Statistical Machine Translation: Parameter Estimation, Computational linguistics, 1993, vol. 19 Issue 2, pp. 263-311.*

* cited by examiner

*Primary Examiner*—David R Hudspeth
*Assistant Examiner*—Lamont M Spooner
(74) *Attorney, Agent, or Firm*—Carr & Ferrell LLP

(57) ABSTRACT

A statistical translation memory (TMEM) may be generated by training a translation model with a naturally generated TMEM. A number of tuples may be extracted from each translation pair in the TMEM. The tuples may include a phrase in a source language and a corresponding phrase in a target language. The tuples may also include probability information relating to the phrases generated by the translation model.

15 Claims, 6 Drawing Sheets

| English | French | Alignment |
|---|---|---|
| one union | syndicat particulier | one → {particulier}; union→ {syndicat} |
| no one union | aucun syndicat particulier ne | no → {aucun, ne}; one → {particulier}; union→ {syndicat} |
| is no one union | aucun syndicat particulier ne est | is → {est}; no → {aucun, ne}; one → {particulier}; union→ {syndicat} |
| there is no one union | aucun syndicat particulier ne est | is → {est}; no → {aucun, ne}; one → {particulier}; union→ {syndicat} |
| is no one union involved | aucun syndicat particulier ne est en cause | is → {est}; no → {aucun, ne}; one → {particulier}; union→ {syndicat}; involved → {en cause} |
| there is no one union involved | aucun syndicat particulier ne est en cause | is → {est}; no → {aucun, ne}; one → {particulier}; union→ {syndicat}; involved → {en cause} |
| there is no one union involved . | aucun syndicat particulier ne est en cause . | is → {est}; no → {aucun, ne}; one → {particulier}; union→ {syndicat}; involved → {en cause}; NULL → { . } |

FIG. 5

| English | French | Judgment |
|---|---|---|
| , but I cannot say | , mais je ne puis dire | correct |
| how did this all come about ? | comment est-ce arrivée ? | correct |
| but , I humbly believe | mais , à mon humble avis | correct |
| final act , the secretary of | final , le secrétaire de | almost correct |
| other parts of Canada than | autres régions de le pays que | incorrect |
| what is the total amount accumulated. | a combien se élève la | incorrect |
| that party present this | ce parti présent aujourd'hui | incorrect |
| the aircraft company to present further studies | de autre études | incorrect |

STATISTICAL METHOD FOR BUILDING A TRANSLATION MEMORY

CROSS-REFERENCE TO RELATED APPLICATION

This application claims the benefit of, and incorporates herein, U.S. Provisional Patent Application No. 60/291,852, filed May 17, 2001.

ORIGIN OF INVENTION

The research and development described in this application were supported by DARPA-ITO under grant number N66001-00-1-9814. The U.S. Government may have certain rights in the claimed inventions.

BACKGROUND

Machine translation (MT) concerns the automatic translation of natural language sentences from a first language (e.g., French) into another language (e.g., English). Systems that perform MT techniques are said to "decode" the source language into the target language.

A statistical MT system that translates French sentences into English has three components: a language model (LM) that assigns a probability P(e) to any English string; a translation model (TM) that assigns a probability P(f|e) to any pair of English and French strings; and a decoder. The decoder may take a previously unseen sentence f and try to maximize the e that find P(e|f), or equivalently maximizes P(e)·P(f|e).

SUMMARY

A statistical translation memory (TMEM) may be generated by training a translation model with a naturally generated TMEM. A number of tuples may be extracted from each translation pair in the TMEM. The tuples may include a phrase in a source language and a corresponding phrase in a target language. The tuples may also include probability information relating to the phrases generated by the translation model.

A number of phrases in the target language may be paired with the same phrase in the source language. The target language phrase having the highest probability of correctness may be selected as a translation equivalent. Alternatively, the target language phrase occurring most frequently in the extracted phrases may be selected as a translation equivalent.

BRIEF DESCRIPTION OF THE DRAWINGS

FIG. 5 is a table including tuples generated from the two sentences in FIG. 2.

FIG. 6 is a table including examples of phrases from a FTMEM and their corresponding correctness judgments

DETAILED DESCRIPTION

Figure 1:
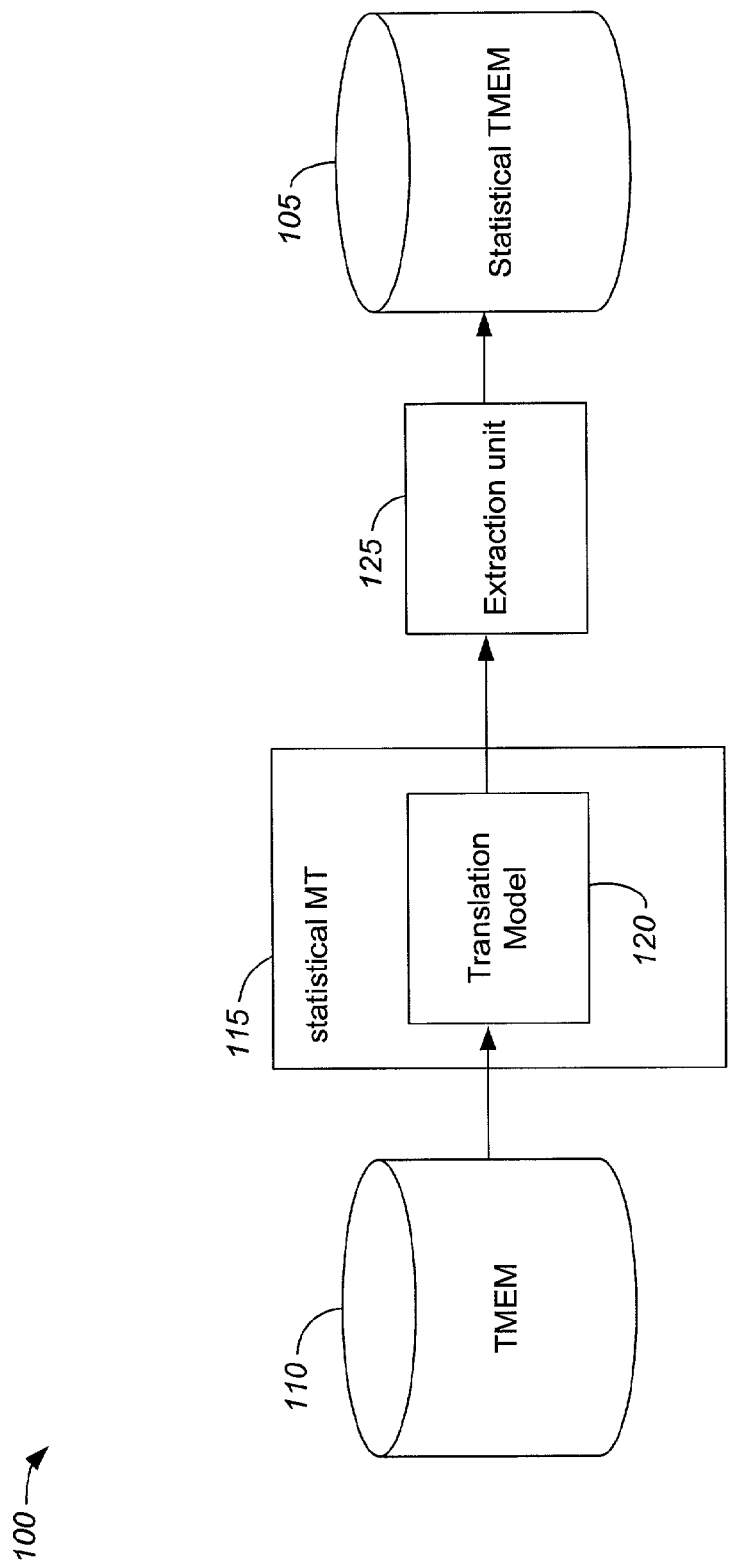
FIG. 1 is a block diagram of a system for generating a statistical translation memory (TMEM).

FIG. 1 illustrates a system 100 for generating and storing translation pairs in a statistical translation memory (TMEM) 105. The statistical TMEM 100 may be used in machine translation (MT) to translate from a source language (e.g., French) to a target language (e.g., English). The MT system 100 may use the statistical TMEM 105 to find translation examples that are relevant for translating an unseen (input) sentence, and then modify and integrate translation fragments to produce correct output sentences.

A pre-compiled TMEM 110 including naturally-generated translation pairs may be used as the basis of the statistical TMEM 105. For example, for a French/English MT, a TMEM such as the Hansard Corpus, or a portion thereof, may be used. The Hansard Corpus includes parallel texts in English and Canadian French, drawn from official records of the proceedings of the Canadian Parliament. The Hansard Corpus is presented as a sequences of sentences in a version produced by IBM Corporation. The IBM collection contains nearly 2.87 million parallel sentence pairs in the set.

Sentence pairs from the corpus may be used to train a statistical MT module 115. The statistical MT module 115 may implement a translation model 120, such as the IBM translation model 4, described in U.S. Pat. No. 5,477,451. The IBM translation model 4 revolves around the notion of a word alignment over a pair of sentences, such as that shown in FIG. 2. A word alignment assigns a single home (English string position) to each French word. If two French words align to the same English word, then that English word is said to have a fertility of two. Likewise, if an English word remains unaligned-to, then it has fertility zero. If a word has fertility greater than one, it is called very fertile.

Figure 2:
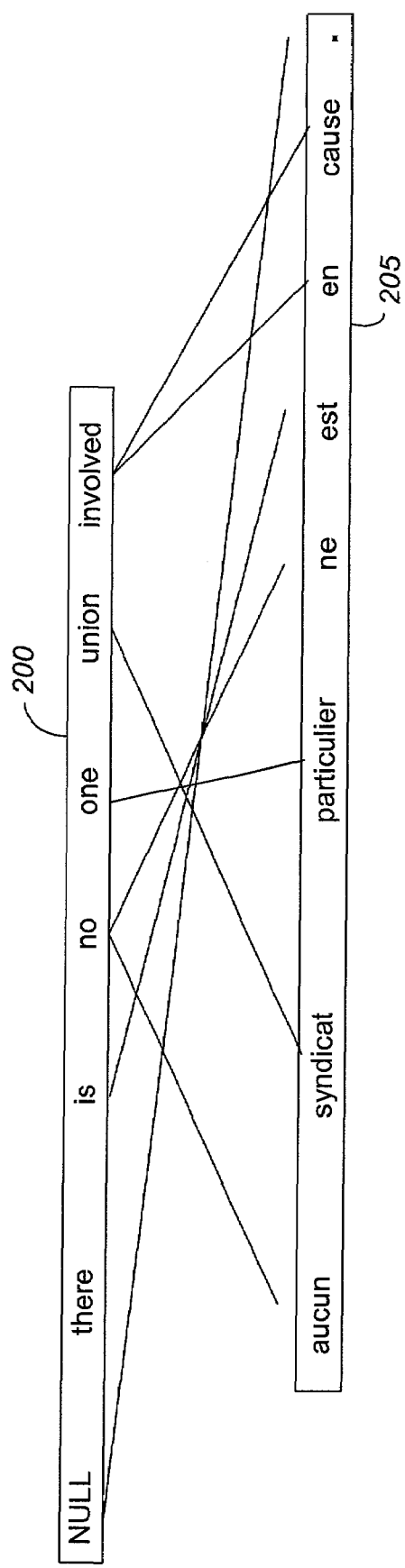
FIG. 2 illustrates the results of a stochastic word alignment operation.
Figure 3:
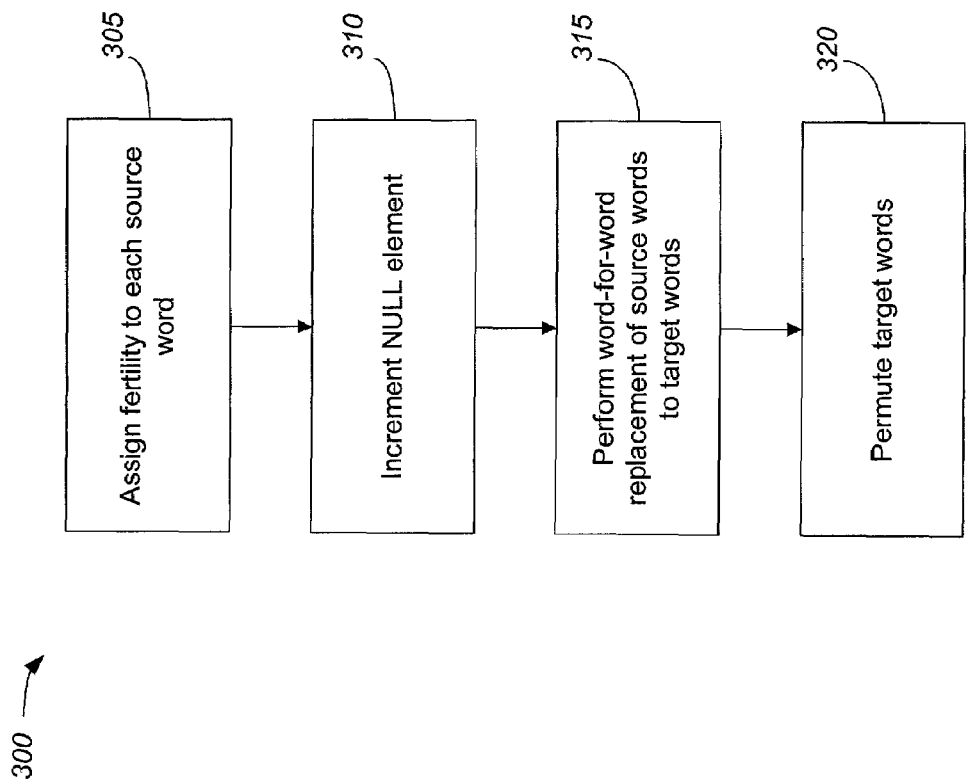
FIG. 3 is a flowchart describing a stochastic process that explains how a source string can be mapped into a target string.

The word alignment in FIG. 2 is shorthand for a hypothetical stochastic process by which an English string gets converted into a French string. FIG. 3 is a flowchart describing, at a high level, such a stochastic process 300. Every English word in the string is first assigned a fertility (block 305). These assignments may be made stochastically according to a table $n(\emptyset|e_i)$. Any word with fertility zero is deleted from the string, any word with fertility two is duplicated, etc. After each English word in the new string, the fertility of an invisible English NULL element with probability $p_1$ (typically about 0.02) is incremented (block 310). The NULL element may ultimately produce "spurious" French words. A word-for-word replacement of English words (including NULL) by French words is performed, according to the table $t(f_j|e_i)$ (block 315). Finally, the French words are permuted (block 320). In permuting, IBM translation model 4 distinguishes between French words that are heads (the leftmost French word generated from a particular English word), non-heads (non-leftmost, generated only by very fertile English words), and NULL-generated.

The head of one English word is assigned a French string position based on the position assigned to the previous English word. If an English word $E_{e-1}$ translates into something at French position j, then the French head word of $e_i$ is stochastically placed in French position k with distortion probability $d_1(k-j|class\ (e_{i-1}),\ class\ (f_k))$, where "class" refers to automatically determined word classes for French and English vocabulary items. This relative offset k-j encourages adjacent English words to translate into adjacent French words. If $e_{i-1}$ is infertile, then j is taken from $e_{i-2}$, etc. If $e_{i-1}$ is very fertile, then j is the average of the positions of its French translations.

If the head of English word $e_i$ is placed in French position j, then its first non-head is placed in French position k (>j) according to another table $d_{>1}(k-j|class\ (f_k))$. The next non-head is placed at position q with probability $d_{22\ 1}(q-k|class\ (f_q))$, and so forth.

After heads and non-heads are placed, NULL-generated words are permuted into the remaining vacant slots randomly. If there are $\emptyset_0$ NULL-generated words, then any placement scheme is chosen with probability $1/\emptyset_0!$.

These stochastic decisions, starting with e, result in different choices of f and an alignment of f with e. The string e is mapped onto a particular <a,f> pair with probability:

$$P(a, f \mid e) = $$

$$\prod_{i=1}^{l} n(\phi_i \mid e_i) \times \prod_{i=1}^{l} \prod_{k=1}^{\phi_i} t(\tau_{ik} \mid e_i) \times \prod_{i=1, \phi_1 > 0}^{l} d_1(\pi_{i1} - c_{pi} \mid \text{class}(e_{pi}),$$

$$\text{class}(\tau_{i1})) \times \prod_{i=1}^{l} \prod_{k=2}^{\phi_i} d_{>1}(\pi_{ik} - \pi_{i(k-1)} \mid \text{class}(\tau_{ik})) \times$$

$$\binom{m - \phi_0}{\phi_0} p_1^{\phi_0} (1 - p_1)^{m-2\phi_0} \times \prod_{k=1}^{\phi_0} t(\tau_{0k} \mid \text{NULL})$$

where the factors separated by "x" symbols denote fertility, translation, head permutation, non-head permutation, null-fertility, and null-translation probabilities, respectively. The symbols in this formula are: l (the length of e), m (the length of f), $e_i$ (the $i^{th}$ English word in e), $e_0$ (the NULL word), $\emptyset_i$ (the fertility of $e_i$), $\emptyset_0$ (the fertility of the NULL word), $\tau_{ik}$ (the $k^{th}$ French word produced by $e_i$ in a), $\pi_{ik}$ (the position of $\tau_{ik}$ in f), $\rho_i$ (the position of the first fertile word to the left of $e_i$ in a), $c_{pi}$ (the ceiling of the average of all $\pi_{\rho ik}$ for $\rho_i$, or 0 if $\rho_i$ is undefined)

In view of the foregoing, given a new sentence f, then an optimal decoder will search for an e that maximizes P (e|f)>>P(e)·P(f|e). Here, P(f|e) is the sum of P(a,f|e) over all possible alignments a. Because this sum involves significant computation, typically it is avoided by instead searching for an <e,a> pair that maximizes P(e,a|f)>>P(e)·P(a,f|e). It is assumed that the language model P(e) is a smoothed n-gram model of English.

Figure 4:
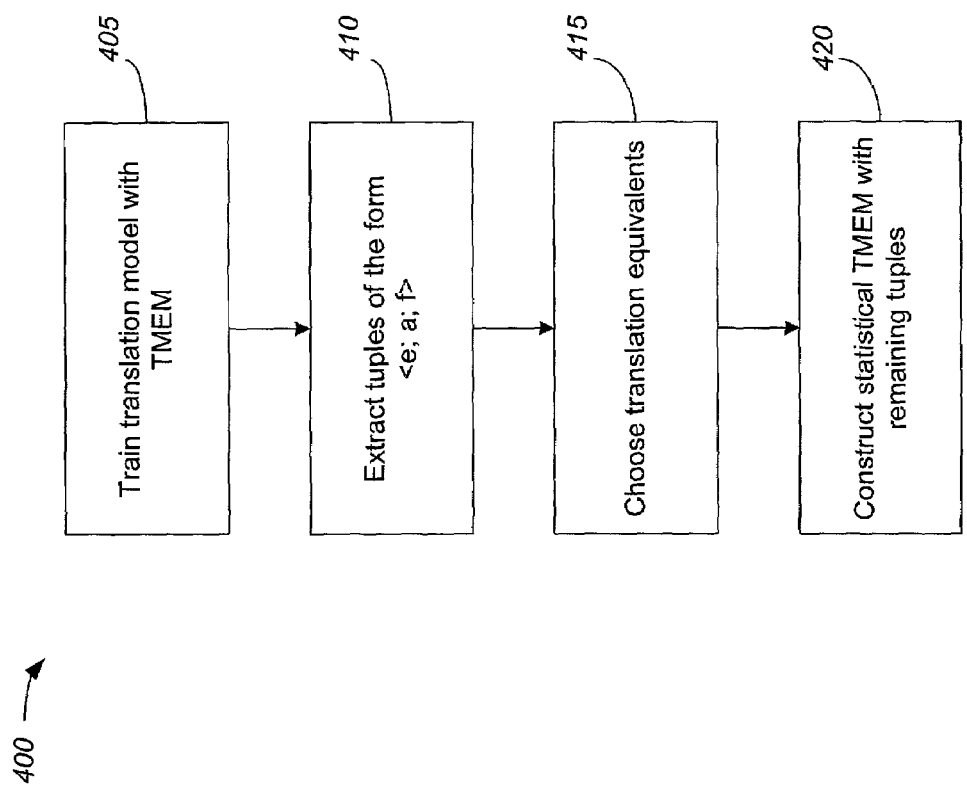
FIG. 4 is a flowchart describing an operation for generating a statistical TMEM.

FIG. 4 is a flowchart describing an operation 400 for generating a statistical TMEM according to an embodiment. The translation model 120 is trained with an existing TMEM 110 (block 405). After training the translation model 120, an extraction module 125 may use the Viterbi (most probable word level) alignment of each sentence, i.e., the alignment of highest probability, to extract tuples of the form <$e_i$, $e_{i+1}$, ..., $e_{i+k}$; $f_j$, $f_{j+1}$, ..., $f_{j+1}$; $a_j$, $a_{j+1}$, ..., $a_{j+1}$> (block 410), where $e_i$, $e_{i+1}$, ..., $e_{i+k}$ represents a contiguous English phrase, $f_j$, $f_{j+1}$, ..., $f_{j+1}$ represents a contiguous French phrase, and $a_j$, $a_{j+1}$, ..., $a_{j+1}$> represents the Viterbi alignment between the two phrases. For example, in the Viterbi alignment of the two sentences in FIG. 2, which was produced automatically, "there" and "." are words of fertility 0, NULL generates the French lexeme ".","is" generates "est", "no" generates "aucun" and "ne", and so on.

When a different translation model is used, the TMEM may contain in addition to the contiguous French/English phrase adjacent information specific to the translation model that is employed.

The tuples may be selected based on certain criteria. The tuples may be limited to "contiguous" alignments, i.e., alignments in which the words in the English phrase generated only words in the French phrase and each word in the French phrase was generated either by the NULL word or a word from the English phrase. The tuples may be limited to those in which the English and French phrases contained at least two words. The tuples may be limited to those that occur most often in the data. Based on these conditions, six tuples may be extracted from the two sentences in FIG. 2, as shown in FIG. 5.

Extracting all tuples of the form <e; f; a> from the training corpus may produce French phrases that were paired with multiple English translations. To reduce ambiguity, one possible English translation equivalent may be chosen for each French phrase (block 415). Different methods for choosing a translation equivalent may be used to construct different probabilistic TMEMs (block 420). A Frequency-based Translation Memory (FTMEM) may be created by associating with each French phrase the English equivalent that occurred most often in the collection of phrases that were extracted. A Probability-based Translation Memory (PTMEM) may be created by associating with each French phrase the English equivalent that corresponded to the alignment of highest probability.

The exemplary statistical TMEMs explicitly encode not only the mutual translation pairs but also their corresponding word-level alignments, which may be derived according to a certain translation model, e.g., IBM translation model 4. The mutual translations may be anywhere between two words long to complete sentences. In an exemplary statistical TMEM generation process, an FTMEM and a PTMEM were generated from a training corpus of 500,000 sentence pairs of the Hansard Corpus. Both methods yielded translation memories that contained around 11.8 million word-aligned translation pairs. Due to efficiency considerations, only a fraction of the TMEMs were used, i.e., those that contained phrases at most 10 words long. This yielded a working FTMEM of 4.1 million and a working PTMEM of 5.7 million phrase translation pairs aligned at the word level using the IBM statistical model 4.

To evaluate the quality of both TMEMs, two hundred phrase pairs were randomly extracted from each TMEM. These phrases were judged by a bilingual speaker as perfect, almost perfect, or incorrect translation. A phrase was considered a perfect translations if the judge could imagine contexts in which the aligned phrases could be mutual translations of each other. A phrase was considered an almost perfect translation if the aligned phrases were mutual translations of each other and one phrase contained one single word with no equivalent in the other language. For example, the translation pair "final, le secrétaire de" and "final act, the secretary of" were labeled as almost perfect because the English word "act" has no French equivalent. A translation was considered an incorrect translations if the judge could not imagine any contexts in which the aligned phrases could be mutual translations of each other.

The results of the evaluation are shown in FIG. 6. A visual inspection of the phrases in the TMEMs and the judgments made by the evaluator suggest that many of the translations labeled as incorrect make sense when assessed in a larger context. For example, "autres régions de le pays que" and "other parts of Canada than" were judged as incorrect. However, when considered in a context in which it is clear that "Canada" and "pays" corefer, it would be reasonable to assume that the translation is correct.

FIG. 6 shows a few examples of phrases from the FTMEM and their corresponding correctness judgments. These judgments may be stored with the FTMEM to be used during translation. These judgments may be used when matching translation pairs to identify good matches (correct translations), less good matches (almost correct translation), and matches to avoid or reject (incorrect translations).

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

Exemplary embodiments of the present invention include an article comprising a machine-readable medium including instructions operative to cause a machine to perform various functions. For example, the machine may train a translation model with a plurality of translation pairs, each translation pair including a text segment in a source language and a corresponding text segment in a target language. Additionally, the machine may generate a plurality of tuples from each of the plurality of translation pairs, each tuple comprising a phrase in the source language, a phrase in the target language, and probability information relating to the phrases. The machine may further store the tuples in a statistical translation memory, wherein the statistical translation memory may be included in the article or other apparatus.

The invention claimed is:

1. A method comprising:
   training a statistical translation model on a plurality of translation pairs, each translation pair including a text segment in a source language and a corresponding text segment in a target language;
   extracting a plurality of tuples from each of a plurality of said translation pairs, each tuple comprising a pair of phrases and a corresponding word level alignment between said pair of phrases, the pair of phrases including a phrase in the source language comprising at least two words and a corresponding phrase in the target language comprising at least two words, the corresponding word level alignment based on the trained statistical translation model; and
   constructing automatically a statistical translation memory from said plurality of tuples, wherein the statistical translation memory encodes a plurality of said pair of phrases and the corresponding word level alignment between each said pair.

2. The method of claim 1, wherein the phrase in the target language corresponds to the phrase in the source language occurring most frequently in the plurality of tuples.

3. The method of claim 1, wherein the phrase in the target language corresponds to the phrase in the source language having an alignment of highest probability.

4. The method of claim 1, further comprising:
   judging a correctness of the plurality of tuples; and
   selecting a tuple as a translation equivalent in response to said judgment.

5. An automatically constructed statistical translation memory comprising:
   a plurality of tuples extracted from each of a plurality of translation pairs, each tuple comprising a pair of phrases and a corresponding word level alignment between said pair of phrases, the pair of phrases including a phrase in the source language comprising at least two words and a corresponding phrase in the target language comprising at least two words, the corresponding word level alignment based on a statistical translation model trained on the translation pairs.

6. The automatically constructed statistical translation memory of claim 5, wherein the phrase in the target language corresponds to the phrase in the source language having an alignment of highest probability.

7. The automatically constructed statistical translation memory of claim 5, wherein the phrase in the target language corresponds to the phrase in the source language occurring most frequently in the plurality of tuples.

8. Apparatus comprising:
   a statistical translation model operative to train on a plurality of translation pairs, each translation pair including a text segment in a source language and a corresponding text segment in a target language;
   an extraction module operative to extract a plurality of tuples from each of a plurality of said translation pairs, each tuple comprising a pair of phrases and a corresponding word level alignment between said pair of phrases, the pair of phrases including a phrase in the source language comprising at least two words and a corresponding phrase in the target language comprising at least two words, the corresponding word level alignment based of the training of the statistical translation model; and
   an automatically constructed statistical translation memory based on said plurality of tuples, wherein the statistical translation memory encodes a plurality of said pair of phrases and the corresponding word level alignment between each said pair.

9. The apparatus of claim 8, wherein the extraction module is operative to select a phrase occurring most frequently in the plurality of tuples.

10. The apparatus of claim 8, wherein the extraction module is operative to select a phrase having a highest probability of being a correct translation of said phrase in the source language.

11. The apparatus of claim 8, wherein the extraction module is operative to select a phrase having an alignment of highest probability with said phrase in the source language.

12. An article comprising a machine-readable medium including instructions operative to cause a machine to perform:
   training a statistical translation model on a plurality of translation pairs, each translation pair including a text segment in a source language and a corresponding text segment in a target language;
   extracting a plurality of tuples from each of a plurality of said translation pairs, each tuple comprising a pair of phrases and a corresponding word level alignment between said pair of phrases, the pair of phrases including a phrase in the source language comprising at least two words and a corresponding phrase in the target language comprising at least two words, the corresponding word level alignment based on the trained statistical translation model; and
   constructing automatically a statistical translation memory from said plurality of tuples, wherein the statistical translation memory encodes a plurality of said pair of phrases and the corresponding word level alignment between each said pair.

13. The article of claim 12, wherein the phrase in the target language corresponds to the phrase in the source language occurring most frequently in the plurality of tuples.

14. The article of claim 12, wherein said constructing comprises selecting a phrase having a highest probability of being a correct translation of said phrase in the source language.

15. The article of claim 12, wherein constructing comprises selecting a phrase having an alignment of highest probability with said phrase in the source language.

* * * * *